Feb. 6, 1951     R. T. SUTHERLAND, JR     2,540,147
TRACTION-INCREASING DEVICE FOR VEHICLE WHEELS
Filed July 7, 1948     3 Sheets-Sheet 1
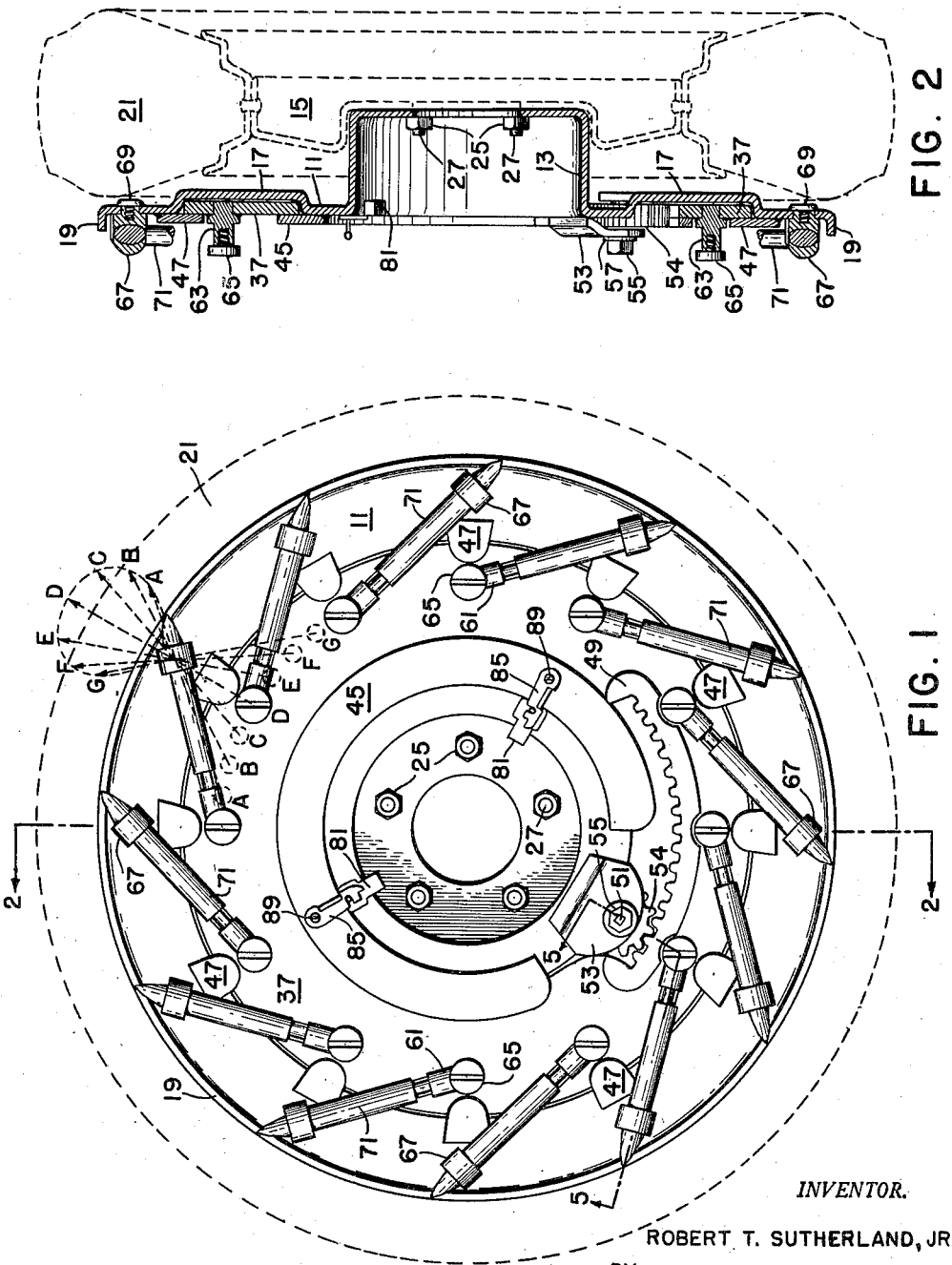
INVENTOR.
ROBERT T. SUTHERLAND, JR.
BY
*M. O. Hayes*
ATTORNEY Feb. 6, 1951 R. T. SUTHERLAND, JR 2,540,147
TRACTION-INCREASING DEVICE FOR VEHICLE WHEELS
Filed July 7, 1948 3 Sheets-Sheet 2

INVENTOR.
ROBERT T. SUTHERLAND, JR.
BY
*M. D. Hayes*
ATTORNEY

Feb. 6, 1951  R. T. SUTHERLAND, JR  2,540,147
TRACTION-INCREASING DEVICE FOR VEHICLE WHEELS
Filed July 7, 1948  3 Sheets-Sheet 3
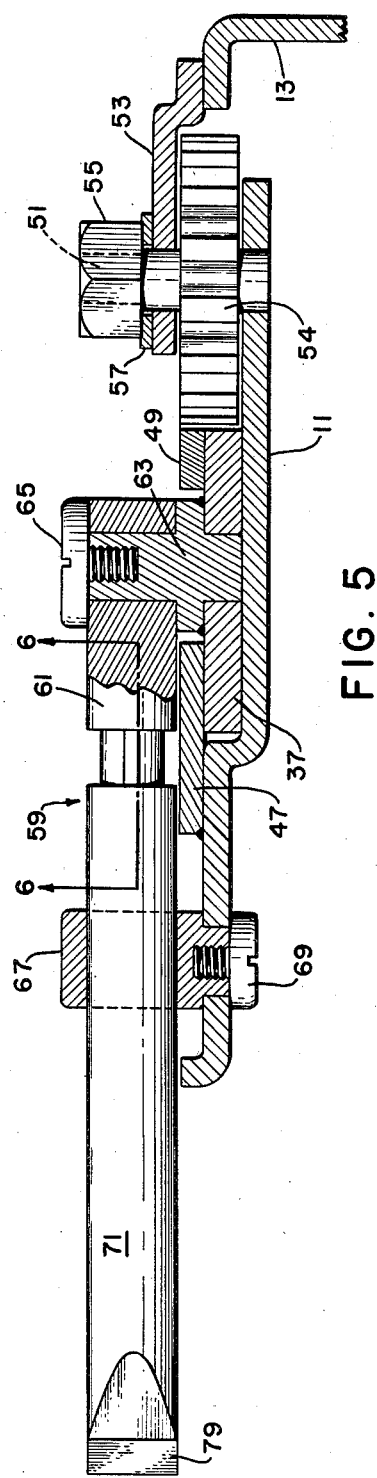
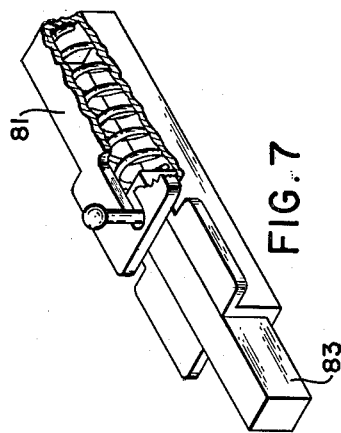
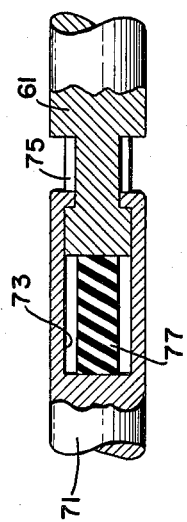
*INVENTOR.*
ROBERT T. SUTHERLAND, JR.
BY M.C.Hayes
*ATTORNEY*

Patented Feb. 6, 1951

2,540,147

UNITED STATES PATENT OFFICE 2,540,147

TRACTION-INCREASING DEVICE FOR VEHICLE WHEELS

Robert T. Sutherland, Jr., New York, N. Y.

Application July 7, 1948, Serial No. 37,337

6 Claims. (Cl. 301—47)

(Granted under the act of March 3, 1883, as amended April 30, 1928; 370 O. G. 757)

This invention relates to improvements in vehicle wheels, and more particularly pertains to improvements in traction-increasing devices for vehicle wheels.

A wide variety of devices and methods have been employed in the past to insure safe and sure traction for wheeled vehicles on any surface and under a range of weather conditions. Tire chains encircling the driving wheels completely, single loops of "trouble chains," treatment of slippery road surfaces with sand, interposition of dry rags, rope or other material between the road surface and the vehicle wheels, snow removal, towing means, use of tire treads designed to afford improved traction on particular types of surfaces, and partial deflation of conventional tires to increase traction are representative of techniques employed.

Such methods are applicable generally to self-propelled vehicles only, and are subject to many disadvantages. The installation and the removal of tire chains or trouble chains requires considerable expenditure of time and effort. Such chains wear quickly on cleared surfaces, and either such wear must be accepted or the chains removed, while still dirty, and stowed until changing conditions require re-installation. With such wear, component chains break and beat against the vehicle body at each revolution of the wheel, or slip off the wheel and become jammed inextricably in the moving parts of the wheel. At other times, chains unhook while in use. Repair or replacement of chains is both difficult and expensive. Chains will not bite into a hard surface, and therefore are of limited value on hard ice and similar surfaces, at times increasing the hazard of driving because of the reduced contact area. Certain consistencies of mud and snow pack around and cover chains completely, thereby destroying their effectiveness. Trouble chains are difficult to install on disc wheels, special provision for their employment, such as boring holes through the disc, being often required. Finally, chains effect a jarring and uncomfortable ride.

The other methods mentioned above are subject to many disadvantages. Sanding of highways is prohibitive in cost, and is done customarily only at selected locations on heavily travelled roads. Deflating tires partly increases tire wear and can ruin tire sidewalls. Use of tires having special treads involves sacrifice in desired riding qualities during the entire period that such tires are mounted. Snow removal and emergency surfacing of portions of roads have obvious shortcomings as alternative practices.

The primary object of this invention is to provide a traction-increasing device for wheeled vehicles that meets the objections to known devices and methods of like nature, yet is simple in construction, inexpensive to manufacture, and can be installed readily on conventional wheels.

Another object is to provide a device of the character described that can be used interchangeably on right or left wheels and can be adjusted facilely when so installed.

Still another object is to provide a device of the character described that can be retracted when conditions do not require its use and projected for use to one of a range of selected positions, as dictated by the particular road conditions encountered.

Other objects and many of the attendant advantages of this invention will be readily appreciated as the same becomes better understood by reference to the following detailed description when considered in connection with the accompanying drawings wherein:

Fig. 1 is a front elevation of a traction-increasing device mounted on a vehicle wheel, which is shown in phantom, showing a preferred embodiment of the invention;

Fig. 2 is a section taken on the line 2—2 of Fig. 1;

Fig. 5 is a section, on an enlarged scale, taken on the line 5—5 of Fig. 1 when the gripper element is extended fully;

Fig. 6 is a section taken on the line 6—6 of Fig. 5; and

Fig. 7 is an enlarged isometric view of the spring lock element thereof.

Similar numerals refer to similar parts throughout the several views.

Figure 4:
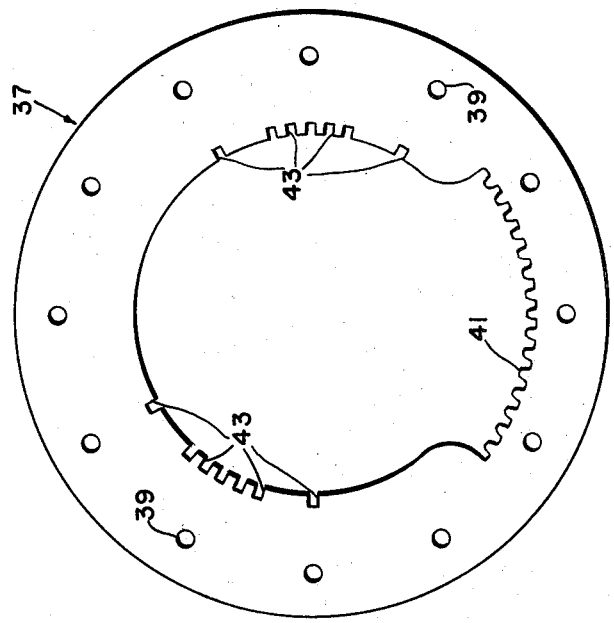
Fig. 4 is a front elevation of the rotatable ring thereof.
Figure 3:
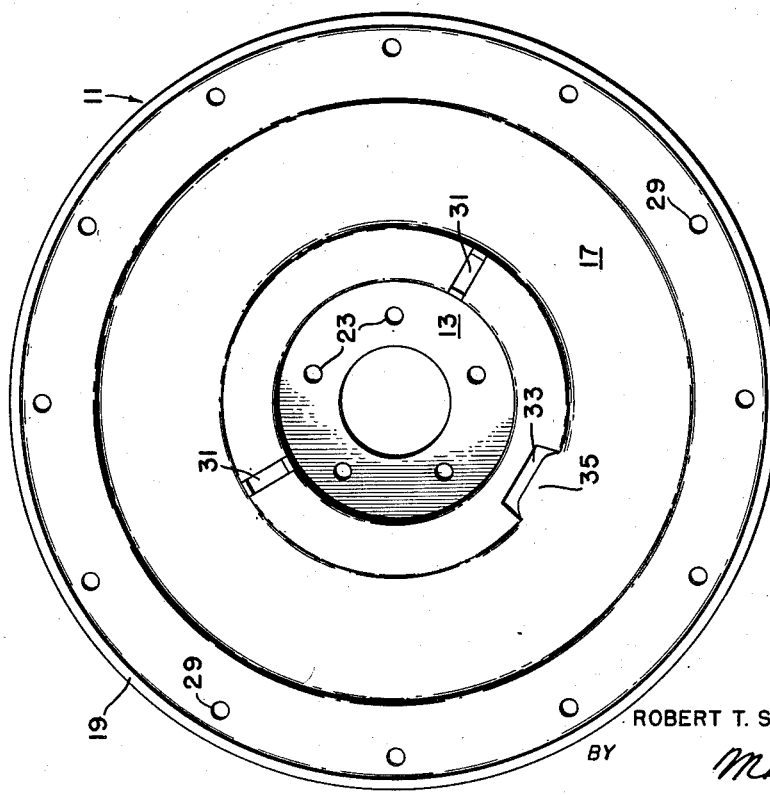
Fig. 3 is a front elevation of the mounting disc of said device.

Mounting disc 11 comprises a central well portion 13 adapted to be seated in the hub recess of a wheel 15, an annular offset or depressed portion 17 adapted to increase rigidity of the disc and to receive compactly the ring element hereinafter described, said portion 17 being spaced from both well portion 13 and the outer rim of said disc, and an upturned rim flange 19 adapted to increase rigidity of the disc and to prevent said disc from chafing the casing of a tire 21 mounted on said wheel. The diameter of mounting disc 11 is sufficiently less than the tire diameter to prevent contact between the mounting disc and the roadway under normal driving conditions when the tire is inflated, yet sufficiently large to prevent rim cutting of the tire casing in the event the tire is deflated and collapses.

A plurality of spaced bolt holes 23 in the annulus forming the base of well portion 13 match the studs used in mounting the wheel, so that installation of the mounting disc 11 upon wheel 15 can be accomplished by removing wheel nuts 25, positioning holes 23 upon the studs 27 of the hub of said wheel, and then re-installing said wheel nuts. In this manner, said mounting disc 11 is locked securely to the wheel.

A plurality of spaced holes 29 in the annular portion of said mounting disc 11 proximate rim flange 19 are provided to position the gripper guides hereinafter described. Notches 31 are provided in the annular portion of said disc proximate the well portion 13 to receive the locking elements hereinafter described. A cutout 33 is made in said portion and the lip 35 thereof flattened to form a support and backing for the pinion hereinafter described.

Ring 37 is a disc seated rotatably in the annular offset of depressed portion 17 of mounting disc 11. Said ring 37 is provided with a plurality of spaced holes 39 proximate the outer periphery thereof, said holes 39 positioning gripper elements in the manner hereinafter described. Gear rack 41 is formed in a portion of the inner periphery of said ring 37, said rack 41 being arcuate, in an arc scribed from the center of rotation of said ring. Said rack 41 is of sufficient length to permit complete reversal of the housed or retracted positions of the grippers, hereinafter described, so that the device can be used interchangeably on right and left wheels. Notches 43 are cut in the inner periphery of said ring 37 to engage the locking elements hereinafter described.

Ring 37 is retained in the depressed portion 17 of disc 11 by means of retaining segment 45, which is welded to disc 11 and laps over a portion of said ring, and by a plurality of retaining lugs 47, each of which is welded to disc 11 and laps over a portion of said ring. Said segment 45 and said lugs 47 thus have loose sliding contact only with ring 37, which is free to rotate relative disc 11. Reinforcing doubler rack 49 is welded to ring 37, as shown in Figs. 1 and 2, thereby increasing tooth-contact area and increasing, consequently, the load-carrying limit of the gearing. Preferably, stub-tooth gear teeth are employed on gear rack 41, doubler rack 49, and the pinion gear hereinafter described.

Pinion shaft 51 is carried at its inner end by mounting disc 11 and at its outer end by pinion support 53, which is welded to mounting disc 11. Pinion 54 is secured fixedly on shaft 51, in mesh with rack 41 and its associated doubler rack 49. Said shaft 51 is provided with a wheel nut 55 and washer 57, said nut 55 being secured on the protruding squared end of said shaft by a drive fit, and preferably being of the same size as nuts 25, so that it can be rotated by means of a conventional wheel-nut wrench, and can thereby rotate ring 37 relative disc 11.

A plurality of traction tools or grippers 59 extend rotatably from ring 37. The head portion 61 of each such gripper is carried rotatably upon a mounting post 63, which is welded to ring 37, and a cap screw 65 is adapted to retain said head portion upon said post. Said mounting posts are positioned in the holes 39 in ring 37. Gripper guides 67 are retained rotatably in the holes 29 in mounting disc 11 by means of cap screws 69. The legs 71 of each such gripper is slidable in the bore of said guide 67, and each such leg has an axial bore 73 in one end. The lip of said bore is swaged, as shown in Fig. 6, to cooperate with the keyway 75 in the head portion 61 so as to prevent separation of leg 71 from head portion 61 and to prevent rotation of leg 71 on its longitudinal axis. An elastic incompressible cylinder 77 is fitted loosely in said bore 73 to permit limited telescoping of head portion 61 and leg 71 upon application of a load.

The legs 71 terminate in a chisel-point road-engaging end 79, as shown in Figs. 1 and 6.

In order to lock ring 37 at a desired position relative mounting disc 11, a self-locking and non-reversing pinion can be substituted for the pinion 54. However, with such arrangement loads will be transmitted partially through the pinion and the rack teeth when the grippers are in extended position. Alternatively, a pair of spring locks 81 are employed. Said locks 81 are secured at notches 31 to the mounting disc 11, as by welding, so that the bolts 83 of said locks can be extended to engage selected notches 43 in ring 37, thereby positioning the grippers 59 at one of their fully retracted positions, as shown in Fig. 1, or at one of the intermediate positions A—A, B—B, C—C, D—D (fully extended position), E—E, F—F or G—G, shown by broken arrows in Fig. 1, or at the other fully retracted position. Spring latches 85 are secured to threaded bores in retaining segment 45 by means of screws 89 to retain bolts 83 in engaged position.

In operation, grippers 59 can be secured in fully retracted or housed position, as shown in Fig. 1. By turning pinion 54 clockwise, ring 37 is rotated clockwise to carry grippers 59 to desired degree of extension, with maximum extension radial the disc 11 achieved at about the midpoint on the rack. Continued rotation then retracts the grippers 59 until said grippers reach the fully retracted or housed position that would be used on wheels on the opposite side of the vehicle. Gripper feed is thus effected by means of a conventional wheel-nut wrench used on wheel nut 55, and degree of extension desired to meet particular road conditions is maintained by engaging lock 81 in a selected notch 43.

The use of an incompressible elastic material permitting limited shortening of effective gripper length under load serves to improve riding qualities and to minimize damage to prepared road surfaces.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. A traction attachment for vehicles comprising a mounting disc having a central well portion adapted to be secured in the hub recess of a wheel, an annular depressed portion concentric with said well portion and an upstanding rim flange, a ring nested rotatably in said depressed portion, said ring including a gear-rack portion cut into its inner periphery, a plurality of grippers carried by said ring and extending rotatably from spaced relation on said ring through gripper guides mounted rotatably on said disc, a pinion gear secured to said disc in mesh with said rack, means to rotate said gear carried by said gear whereby said ring is rotated relative said disc, and means to lock said ring to said disc mounted on said disc.

2. A traction attachment for vehicles comprising a mounting disc having a central well portion adapted to be secured in the hub recess of a wheel upon the studs thereof, said disc having an annular depressed portion concentric with said well portion and an upstanding rim flange, a ring nested rotatably in said depressed portion, said ring including a gear-rack portion and a plurality of spaced notches cut into its inner periphery, a retaining segment secured to said disc and lapping a portion of the inner periphery of said ring, a plurality of lugs secured to said disc and lapping the outer periphery of said ring, a plurality of grippers carried by said ring and extending rotatably from spaced relation on said ring through gripper guides mounted rotatably on said disc, a pinion gear secured to said disc in mesh with said rack, means to rotate said gear carried by said gear whereby said ring is rotated relative said disc, and means to lock said ring to said disc mounted on said disc, engageable with one of said notches.

3. A traction attachment for vehicles comprising a mounting disc having a central well portion adapted to be secured in the hub recess of a wheel upon the studs thereof, said disc having an annular depressed portion concentric with said well portion and an upstanding rim flange, a ring nested rotatably in said depressed portion, said ring including a gear-rack portion and a plurality of spaced notches cut into its inner periphery, a retaining segment secured to said disc and lapping a portion of the inner periphery of said ring, a plurality of lugs secured to said disc and lapping the outer periphery of said ring, a plurality of grippers carried by said ring and extending rotatably from spaced relation on said ring through slide bearings in gripper guides mounted rotatably on said disc, a pinion gear secured to said disc in mesh with said rack, means to rotate said gear carried by said gear whereby said ring is rotated relative said disc, and means to lock said ring to said disc, said locking means including one or more spring locks secured to said disc, said locks each having a bolt adapted to be extended into a selected notch in said ring, and means carried by said locks to retain said bolt in said notch.

4. A traction attachment for vehicles comprising a mounting disc having a central well portion adapted to be secured in the hub recess of a wheel upon the studs thereof, said disc having an annular depressed portion concentric with said well portion and an upstanding rim flange, a ring nested rotatably in said depressed portion, said ring including a gear rack portion, a doubler rack secured to said gear-rack portion, and a plurality of spaced notches cut into its inner periphery, a retaining segment secured to said disc and lapping a portion of the inner periphery of said ring, a plurality of lugs secured to said disc and lapping the outer periphery of said ring, a plurality of grippers carried by said ring and extending rotatably and radially outwardly from spaced relation on said ring through slide bearings in gripper guides mounted rotatably on said disc, a pinion gear secured to said disc in mesh with said rack and said doubler rack, means to rotate said gear carried by said gear whereby said ring is rotated relative said disc, and means to lock said ring to said disc, said locking means including one or more spring locks secured to said disc, said locks each having a bolt adapted to be extended into a selected notch in said ring, and means carried by said locks to retain said bolt in said notch.

5. A traction attachment for vehicles comprising a mounting disc having a central well portion adapted to be secured in the hub recess of a wheel upon the studs thereof, said disc having an annular depressed portion concentric with said well portion and an upstanding rim flange, a ring nested rotatably in said depressed portion, said ring including a gear-rack portion, and a plurality of spaced notches cut into its inner periphery, a doubler rack secured to said gear-rack portion, a retaining segment secured to said disc and lapping a portion of the inner periphery of said ring, a plurality of lugs secured to said disc and lapping the outer periphery of said ring, a plurality of grippers carried by said ring and extending rotatably and radially outwardly from spaced relation on said ring through slide bearings in gripper guides mounted rotatably on said disc, each of said grippers having means to decrease their effective length upon application of a predetermined load, a pinion gear secured to said disc in mesh with said rack, means to rotate said gear carried by said gear whereby said ring is rotated relative said disc, and means to lock said ring to said disc, said locking means including one or more spring locks secured to said disc, said locks each having a bolt adapted to be extended into a selected notch in said ring, and means carried by said locks to retain said bolt in said notch.

6. A traction attachment for vehicles comprising a mounting disc having a central well portion adapted to be secured in the hub recess of a wheel upon the studs thereof, said disc having an annular depressed portion concentric with said well portion and an upstanding rim flange, a ring nested rotatably in said depressed portion, said ring including a gear-rack portion, and a plurality of spaced notches cut into its inner periphery, a doubler rack secured to said gear-rack portion, a retaining segment secured to said disc and lapping a portion of the inner periphery of said ring, a plurality of lugs secured to said disc and lapping the outer periphery of said ring, a plurality of grippers carried by said ring and extending rotatably and radially outwardly from spaced relation on said ring through slide bearings in gripper guides mounted rotatably on said disc, each of said grippers having a leg adapted to telescope against the resistance of a compressible elastic material carried interior said gripper upon application of a predetermined load, means to prevent rotation of said grippers on their longitudinal axes, a pinion gear secured to said disc in mesh with said rack, means to rotate said gear carried by said gear whereby said ring is rotated relative said disc, and means to lock said ring to said disc, said locking means including one or more spring locks secured to said disc, said locks each having a bolt adapted to be extended into a selected notch in said ring, and means carried by said locks to retain said bolt in said notch.

ROBERT T. SUTHERLAND, Jr.

REFERENCES CITED

The following references are of record in the file of this patent:

UNITED STATES PATENTS

| Number | Name | Date |
|---|---|---|
| 1,366,810 | Kimble | Jan. 25, 1921 |
| 1,849,004 | Glapion | Mar. 8, 1932 |
| 2,249,138 | Hill | July 5, 1941 |